(12) United States Patent
Marche et al.

(10) Patent No.: US 10,599,417 B2
(45) Date of Patent: Mar. 24, 2020

(54) REMOTE ADMINISTRATION TECHNIQUE

(71) Applicant: Orange, Paris (FR)

(72) Inventors: Mikael Marche, Saint Pierre d'allevard (FR); Julien Rouland, Saint Martin d'heres (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 15/562,733

(22) PCT Filed: Mar. 18, 2016

(86) PCT No.: PCT/FR2016/050612
§ 371 (c)(1),
(2) Date: Sep. 28, 2017

(87) PCT Pub. No.: WO2016/156696
PCT Pub. Date: Oct. 6, 2016

(65) Prior Publication Data
US 2018/0074809 A1     Mar. 15, 2018

(30) Foreign Application Priority Data

Mar. 31, 2015   (FR) ...................... 15 52753

(51) Int. Cl.
*G06F 9/445*     (2018.01)
*G06F 19/00*     (2018.01)
(Continued)

(52) U.S. Cl.
CPC .............. *G06F 8/65* (2013.01); *H04L 41/082* (2013.01); *H04L 41/0886* (2013.01);
(Continued)

(58) Field of Classification Search
CPC ..... G06F 8/65; G06F 8/61; G06F 8/62; G06F 2201/865; G06F 8/71; G06F 9/45533;
(Continued)

(56) References Cited

U.S. PATENT DOCUMENTS 8,700,804 B1 *  4/2014  Meyers ............... H04L 67/1095
                                                    709/217
9,594,875 B2 *  3/2017  Arrizza .................... G06F 8/65
(Continued)

FOREIGN PATENT DOCUMENTS

EP        1760583 A1     3/2007
WO    2010030480 A2     3/2010

OTHER PUBLICATIONS

H. Becht, Moving towards goal-based safety management, 8 pages (Year: 2011).*
(Continued)

*Primary Examiner* — Thuy Dao
(74) *Attorney, Agent, or Firm* — David D. Brush; Westman, Champlin & Koehler, P.A.

(57) ABSTRACT

A technique is provided for remote administration of a device from a local network via an administration server connected to an extended communication network. A first module obtains at least one datum representing a human activity in a geographical area in which the device to be updated is located. A second module postpones updating of the device when the datum obtained indicates human activity in the geographical area. The first and second modules are included in the administration server or in the device to be updated.

10 Claims, 4 Drawing Sheets

(51) Int. Cl.
*G06F 9/44* (2018.01)
*H04L 29/08* (2006.01)
*G06F 8/65* (2018.01)
*H04L 12/24* (2006.01)
*H04W 4/50* (2018.01)
*H04W 4/021* (2018.01)

(52) U.S. Cl.
CPC .............. *H04L 67/22* (2013.01); *H04L 67/34* (2013.01); *H04W 4/50* (2018.02); *H04L 41/12* (2013.01); *H04W 4/021* (2013.01)

(58) Field of Classification Search
CPC ...... H04W 4/50; H04W 88/06; H04L 41/082; H04L 41/0886; H04L 41/12; H04L 29/06; H04L 67/00; H04L 67/22; H04L 67/34; H04L 67/10; H04L 67/1095; H04L 67/26; G06Q 30/0641
See application file for complete search history.

(56) References Cited

U.S. PATENT DOCUMENTS

| | | | | |
|---|---|---|---|---|
| 9,600,266 B2* | 3/2017 | Molin | ................. | G06F 8/65 |
| 2006/0265708 A1* | 11/2006 | Blanding | ................. | G06F 8/61 |
| | | | | 717/174 |
| 2009/0270810 A1* | 10/2009 | DeBelser | ............. | A61M 5/142 |
| | | | | 604/151 |
| 2010/0135201 A1 | 6/2010 | Lewis et al. | | |
| 2010/0174229 A1* | 7/2010 | Hsu | ...................... | A61M 5/142 |
| | | | | 604/66 |
| 2013/0332917 A1* | 12/2013 | Gaither | ................. | G06F 8/656 |
| | | | | 717/170 |
| 2014/0237465 A1* | 8/2014 | Lin | .................... | H04L 67/1063 |
| | | | | 717/173 |
| 2014/0276571 A1* | 9/2014 | Ludolph | ............... | A61M 5/172 |
| | | | | 604/506 |
| 2014/0325379 A1* | 10/2014 | McDevitt | ................ | G06F 9/526 |
| | | | | 715/746 |
| 2015/0178061 A1* | 6/2015 | Wang | ....................... | G06F 8/65 |
| | | | | 717/172 |
| 2015/0370597 A1* | 12/2015 | Faaborg | ................... | G06F 9/46 |
| | | | | 718/102 |

OTHER PUBLICATIONS

English translation of the International Written Opinion of the International Searching Authority dated Jun. 27, 2016 for corresponding International Application No. PCT/FR2016/050612, filed Mar. 18, 2016.

International Search Report dated Jun. 27, 2016 for corresponding International Application No. PCT/FR2016/050612, filed Mar. 18, 2016.

Written Opinion of the International Searching Authority dated Jun. 27, 2016 for corresponding International Application No. PCT/FR2016/050612, filed Mar. 18, 2016.

Broadband Forum, TR-069 'CPE WAN Management Protocol' Nov. 2013.

* cited by examiner

REMOTE ADMINISTRATION TECHNIQUE

CROSS-REFERENCE TO RELATED APPLICATIONS

This Application is a Section 371 National Stage Application of International Application No. PCT/FR2016/050612, filed Mar. 18, 2016, the content of which is incorporated herein by reference in its entirety, and published as WO 2016/156696 on Oct. 6, 2016, not in English.

FIELD OF THE DISCLOSURE

The invention pertains to the general field of telecommunications.

The invention relates more particularly to the remote administration of a device of a local area network by an administration server connected to a wide area communication network.

BACKGROUND OF THE DISCLOSURE

In order to guarantee quality services, it is preferable for a network operator to be able to administer devices remotely.

The remote administration of devices requires in particular:
- detecting and recognizing the administered devices, for example their serial numbers and their software and hardware versions;
- monitoring these devices, for example by obtaining monitoring information and performance indicators.

In a local area network, an access gateway enables in particular devices located in a client site to access a WAN (Wide Area Network) wide area communication network, such as the Internet. These devices are also called CPE, for 'Customer Premises Equipment'. For a local area network, these may be in particular the access gateway, a 'Set-Top Box' TV decoder or a mobile terminal. In the context of a home automation network, these may also be household appliances, alarm systems or sensors.

The remote management of the devices of a local area network is based, for example, on a technical report drawn up by the Broadband Forum, TR-069 'CPE WAN Management Protocol'. This technical report defines a CWMP protocol specifying the communication between an administration server, called remote ACS (Auto-Configuration Server), and a device of the local area network. The CWMP protocol defines a mechanism that enables in particular a secure auto-configuration of the devices of the local area network and of other functions for managing these devices.

It is possible in particular for the operator of the network to perform remote interventions, such as:
- updating the software or the firmware of a device when the software version or the firmware needs to be upgraded;
- performing diagnostics when a device exhibits a fault;
- dynamically installing and configuring new services;
- monitoring the state and the performance of a device.

The CWMP protocol is based on the Internet protocol, more precisely on TCP/IP (for 'Transmission Control Protocol').

The remote updating of the software or of the firmware is an operation that requires particular precautions. It is preferable not to interrupt it during execution.

Specifically, this risks corrupting the software or the firmware and preventing operation of the device being updated. Moreover, the updating operation may cause a service interruption on the part of the device. When the device is a gateway for accessing the wide area network for a set of devices of a local area network, the service is also interrupted for this set of devices. The updates are thus often programmed by the operator so as to be executed during the night, in order to limit the impact thereof. However, it is not guaranteed that the device to be updated is not being used during a night-time update. It is emphasized here that the updates are generally performed without a request for validation on the part of a user of the device.

SUMMARY

According to a first aspect, one subject of the invention is a method for the remote administration of a device of a local area network by an administration server connected to a wide area communication network, said method comprising:
- obtaining at least one item of data representative of human activity in a geographical area in which the device to be updated is situated;
- deferring the update when the item of data obtained indicates human activity in said geographical area.

An item of data representative of human activity, also called item of actimetry data, indicates whether human activity, or live activity, is detected or not, and is associated with a geographical area. Activity probes or sensors, for example home automation sensors, are arranged in a service area of the device and provide items of information making it possible to deduce therefrom human activity or an absence of human activity within a detection perimeter. A home automation sensor corresponds for example to a motion sensor, a presence sensor, an event detector (for example, door opening or closure, activation of a household appliance), a sensor for a health service, etc. The item of actimetry data may be provided directly by a sensor, or else be deduced from an analysis of items of information collected by sensors. By way of illustrative example, an instantaneous consumption of electricity or of water makes it possible to deduce human activity in a geographical area.

This human activity may be linked to one or more users likely to use the device to be updated. By way of illustrative example, the device to be updated is a TV decoder, also called STB, for 'Set-Top Box'. This device is situated in the lounge of a dwelling, corresponding to a service area of a local area network. If no human activity is detected in the lounge, it is possible to deduce therefrom that no user is likely to use the device, and that the update is able to be performed immediately. In the opposite case, that is to say when human activity is detected in the lounge, the update is deferred.

It is thus understood that, by virtue of the method, the impact of an update on a person likely to use a device situated in the service area of the local area network is limited. This is particularly important when this update involves a service interruption associated with restarting the device.

This method is in particular advantageous when the operator of the network does not possess technical means for notifying the person or people likely to use the device and asking them for their consent before performing an update. Specifically, some devices do not have a complex human-machine interface enabling them to interact with the user(s) in a simple and friendly manner. This is the case for example for TV decoders, access points for the wide area communication network, or home gateways. Thus, a deferral of the update may be decided on the basis of an item of data representative of human activity indicating human or live activity in a geographical area in which the device to be updated is situated. This human or live activity may correspond to that of any person, whether they be a user of the device or not.

The update is moreover performed independently of human activity of a user who owns the device. This is particularly important in an environment such as a dwelling, where all of the members of a family are likely to be users of the device.

It is emphasized here that, in one particular embodiment, the method makes use of items of actimetry data that are compiled on the basis of physical measurements that are collected by sensors or probes for a service, such as a smart home automation service. This service implements a set of automated and smart solutions by way of rules of action, which check and observe the environment of the local area network in order to implement comfort, security, energy management and health functions. Thus, in this embodiment, it is not necessary to deploy new appliances in the local area network. This smart home automation service may be provided by the operator of the home or local area network, or else be able to be interrogated by an appliance of the latter.

The method thus couples items of actimetry data that are collected for example for a home automation service with a service for administering the devices of a local area network in order to improve the user experience. In one particular embodiment, a device for collecting items of human activity information (also called 'home automation box') is itself administered by the operator of the home network.

In other words, if the actimetry of the environment of the local area network or of a room in which a device is present and is to be updated is zero, an absence of human or live activity is deduced therefrom. The operator is able to use this item of absence of human activity information to update the devices that he administers, without the risk of disrupting a user. The item of actimetry data may correspond to an explicit item of absence of human activity information that is sent by a sensor, or else be deduced implicitly from the absence of reception of items of information from one or more sensors or probes.

The various embodiments or features mentioned hereinafter may be added, independently or in combination with one another, to the steps of the remote administration method such as defined previously.

In one particular embodiment, the administration server obtains one or more items of activity data from an actimetry server, associated with the smart home automation server and connected to the wide area communication network. This actimetry server centralizes the items of information for a set of local area or home automation networks. It compiles items of actimetry data from items of information that are collected by probes or sensors.

In one particular embodiment, the remote administration method furthermore comprises sending of an update command by the administration system to the device, the execution of said update being conditional upon said obtained item of data.

In this embodiment, the device to be updated obtains the item of data representative of human activity and takes the decision itself whether or not to execute the update on the basis of the item of data representative of human activity. A conditional update command is thus sent to the device by the administration server.

In one particular embodiment, the item of data is received from an activity sensor located in the geographical area.

In this embodiment, the method is simple to implement.

The sensor(s) transmit items of activity information spontaneously at regular intervals or else following a modification.

In another embodiment, the items of information are obtained upon subscription directly to the sensor or else to the actimetry server.

In one particular embodiment, the item of data is determined from a plurality of items of information that are collected from activity sensors that are distributed in a service area of the local area network.

Thus, the item of data representative of human activity is obtained by aggregating a plurality of items of information or else by correlating at least two items of information. The item of data representative of human activity that is obtained is thus more reliable.

In one particular embodiment, the update is executed following the obtaining of a new item of data representative of human activity in the geographical area indicating human inactivity in said geographical area.

The deferred update may be executed as soon as a new item of data representative of human activity indicating an absence of human activity is obtained. The disruption risk associated with the updating operation is thus reduced for the user(s) of the device.

In one particular embodiment, the update is executed upon expiry of a deferral period.

So as not to defer the update indefinitely, the latter may be forced upon expiry of the deferral period, independently of the item of data representative of human activity.

According to a second aspect, the invention also relates to a system for the remote administration of devices, said system comprising:
- an administration server connected to a wide area communication network, designed to remotely administer a device of a local area network;
- at least one device of a local area network, which device is to be updated;
- a module for obtaining at least one item of data representative of human activity in a geographical area in which the device to be updated is situated;
- an update command module, designed to defer the update when the item of data obtained indicates human activity in said geographical area.

The advantages outlined for the remote administration method according to the first aspect are able to be transposed directly to the system.

According to a third aspect, the invention also relates to a server for the remote administration of devices, said server comprising:
- an administration module, designed to remotely administer at least one device of a local area network;
- a module for obtaining at least one item of data representative of human activity in a geographical area in which the device to be updated is situated;
- an update command module, designed to defer the update when the item of data obtained indicates human activity in said geographical area.

The advantages outlined for the remote administration method according to the first aspect are able to be transposed directly to the server.

According to a fourth aspect, the invention also relates to a device of a local area network, said device comprising:
- an administration module, designed to be administered remotely by an administration server;
- a module for obtaining at least one item of data representative of human activity in a geographical area in which the device to be updated is situated;

an update command module, designed to defer the update when the item of data obtained indicates human activity in said geographical area.

The advantages outlined for the remote administration method according to the first aspect are able to be transposed directly to the device.

According to a fifth aspect, the invention relates to a device, comprising program code instructions intended to command the execution of those steps of the previously described remote administration method that are implemented by the device, when this program is executed by this device, and a recording medium able to be read by a device and on which a program for a device is recorded.

The device corresponds to the administration server or else to the device of the local area network, which device is to be updated.

The advantages outlined for the remote administration method according to the first aspect are able to be transposed directly to the program for a device and to the recording medium.

BRIEF DESCRIPTION OF THE DRAWINGS

The technique for the remote administration of a device of a local area network will be better understood with the aid of the following description of particular embodiments, with reference to the appended drawings, in which.

BRIEF DESCRIPTION OF THE DRAWINGS

Figure 1:
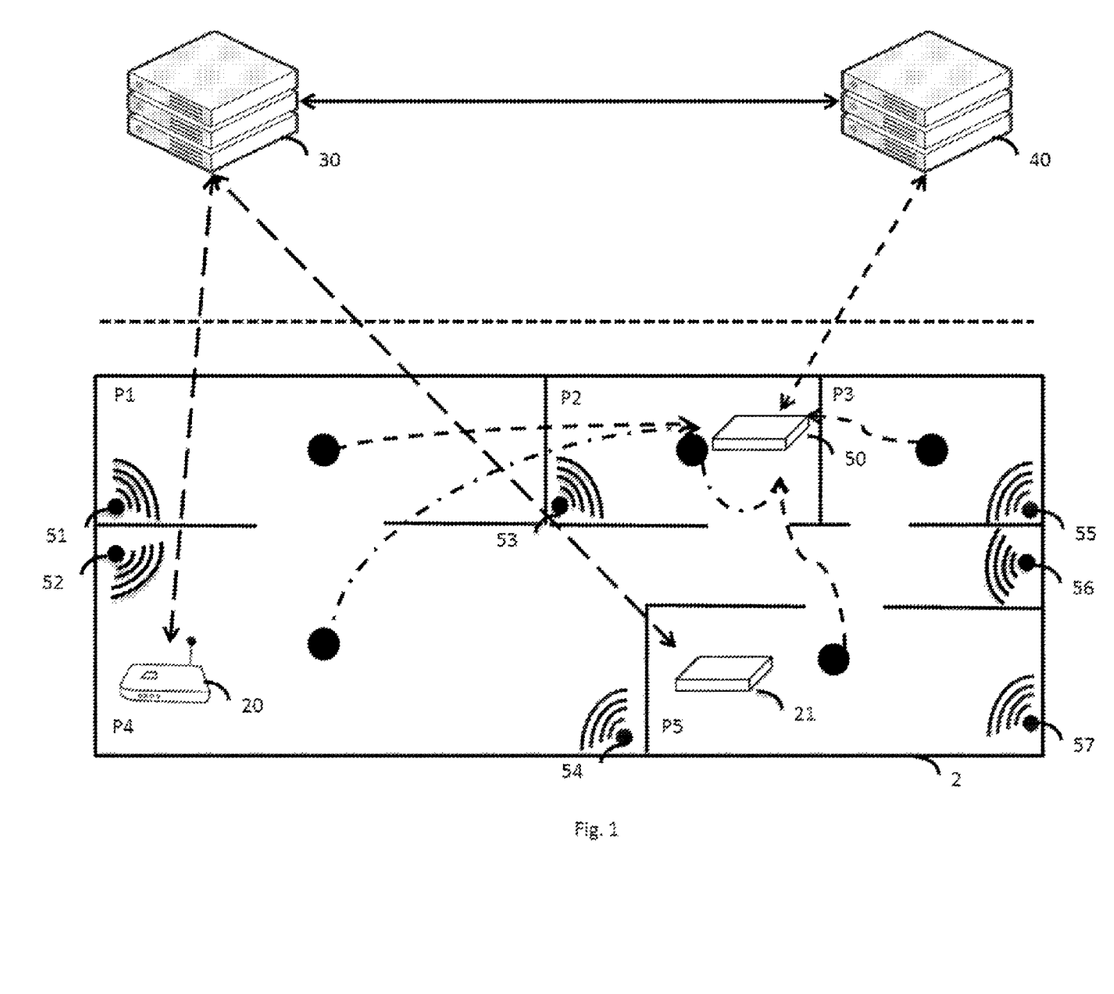
FIG. 1 shows a remote administration system in a communication network in one particular embodiment.

FIG. 1 shows, in their environment, a plurality of devices 20, 21 of a local area network that are administered remotely by a set of administration appliances. The IP (for 'Internet Protocol') protocol is used by the devices to communicate with one another in the local area network and also to communicate with a WAN (for 'Wide Area Network') wide area communication network, such as the Internet, not shown in FIG. 1.

For the environment shown in FIG. 1, local area communication network 2 is understood to mean a LAN ('Local Area Network') type network. This network may be in particular a home network or a business network. An access gateway 20 is designed to provide devices of the local area network with access to the wide area communication network (for example the Internet) by way of an access network. The access network is for example an xDSL (for 'Digital Subscriber Line', the x indicating that it may be an ADSL, HDSL, VDSL, etc. network) access network. It may also be an FTTH (for 'Fiber To The Home') network. There is no limitation attached to the type of access network. To simplify FIG. 1, the local area network is shown in the form of a layout of a dwelling. This dwelling comprises a set of rooms P1-P5.

The local area network 2 may equally be a wired network of Ethernet type, in accordance with the standard IEEE 802.3, or a wireless network of Wi-Fi type, in accordance with the standard IEEE 802.11, or else a power-line network CPL.

The devices of a local area network 2 may be any devices, for example home devices, having a wired or wireless network connection. They may be for example a computer, a touchscreen tablet, a mobile telephone, an Internet-enabled radio set, a landline telephone, an overhead projector, a television, a TV decoder ('Set-Top Box'), a gaming console, household devices, etc. A limitation is made hereinafter to devices administered remotely by the set of administration appliances. These devices are also called CPE, for 'Customer Premises Equipment'. Such devices play a role in the implementation of a service provided by the operator to a client. They may be for example a gateway for accessing the wide area communication network, a TV decoder, a home automation network controller, etc. The device 21 is for example a TV decoder.

The set of administration appliances groups together a plurality of appliances enabling the operator of the communication network to administer and to monitor devices, in particular devices belonging to local area networks, including the access gateway 20 and the TV decoder 21. The set of administration appliances comprises in particular an administration server 30, also called ACS ('Auto-Configuration Server'), a call center and operational support centers (OSS, for 'Operational Support System') or business support centers (BSS, for 'Business Support System').

In the embodiment described, the administration server 30 dialogs with the devices of the local area network 2 with a view to administering them in accordance with the CWMP remote management protocol ('CPE WAN Management Protocol') defined in the technical report TR-069 drawn up by the Broadband Forum. There is no limitation attached to the use of this particular protocol. In other embodiments, it is for example possible to implement the OMA-Device Management specification defined by the organisation OMA (for 'Open Mobile Alliance') for the administration of mobile terminals.

By way of the CWMP protocol, the administration server 30 is able in particular to:
obtain and remotely manage a state of the local area network 2, of the devices that are connected thereto;
initiate diagnostic tests;
download software or firmware files, and
manage events.

The remote administration application uses the CWMP protocol and is based on TCP/IP, SSL/TLS (for 'Secure Sockets Layer/Transport Layer Security'), HTTP (for 'HyperText Transfer Protocol'), SOAP (for 'Simple Object Access Protocol') and RPC (for 'Remote Procedure Call') protocol layers.

We will subsequently contemplate, by way of illustration, the context of a home local area network. There is no limitation attached to this particular example, and the following description is able to be transposed easily to a local area network of the business network type.

An actimetry service is also provided in the environment of the local area network 2. Actimetry is a name for a measurement of human activity, also called live activity. To this end, home automation probes or sensors 51-57 are distributed in the various rooms of the dwelling. These probes or sensors, also called activity sensors, perform physical measurements, on the basis of which it is possible to detect human (or live) activity or an absence of human activity in a geographical area of the local area network, that is to say a room in this example. The home automation sensors 51-57 correspond for example to motion detectors, cameras, electric sockets analyzing consumption, probes (water, heat, electricity, etc.) etc. The sensor 51 is positioned in a corner of the room P1 (kitchen). The sensors 52 and 54 are each positioned in a corner of the room P4 (lounge), in which the device 20 is situated. The sensor 53 is positioned in a corner of the room P2 (first bedroom), in which an information collection device 50 is also situated, in particular for items of human (or live) activity information. The sensor 55 is positioned in a corner of the room P3 (bathroom). The sensor 57 is positioned in a corner of the room P5 (second bedroom), in which the device 21 is installed. The sensor 56 is positioned in a hallway for accessing the rooms P2, P3, P5. These sensors communicate with the collection device 50 by way of a wireless communication network, in accordance for example with the Z-Wave, Zigbee, 'Wireless M-BUS', etc. standards. There is no limitation attached to this wireless communication network.

The collection device 50, also called 'home automation box', is designed to receive, from the home automation sensors 51-57, physical measurements, to analyze these measurements in order to produce contextualized items of information, such as items of actimetry data, and to transmit the items of actimetry data to an actimetry server 40. An item of actimetry data is an item of data representative of human (or live) activity in a geographical area, for example a room, at a given instant. The physical measurements correspond for example to a detection or an absence of detection of presence, a detection of an opening or of a closure of doors, shutters, an instantaneous consumption of electricity or of water, etc. The item of data representative of human (or live) activity is thus determined from a plurality of items of information or physical measurements that are collected from activity sensors that are distributed in a service area of the local area network. In other words, this item of data makes it possible to indicate whether a person is active in a geographical area.

There is no limitation attached to the type of sensors, or to the type of measurements performed. The actimetry server 40 centralizes the checking and the observation of the home automation sensors of the dwelling. The items of actimetry data may for example be used for a monitoring service in the context of a home care service for an elderly person. This service is given solely by way of illustration, and there is no limitation attached to this service. The items of actimetry data provide for example an indication of whether a person is present in the dwelling, or whether a person is present in a room of the dwelling.

In FIG. 1, by way of illustration, the activity sensors 51, 55, 57 send an item of human inactivity information to the collection device 50 (dashed line in FIG. 1), and the activity sensors 52, 53 send an item of human activity information to the collection device 50 (dotted-and-dashed line in FIG. 1). The actimetry server 40 thus obtains, at a given instant:
  for each of the rooms P4 (lounge) and P2 (first bedroom), an item of data indicating human activity,
  for each of the rooms P1 (kitchen), P3 (bathroom) and P5 (second bedroom), an item of data indicating an absence of human activity,
  for the dwelling as a whole, an item of data indicating human activity.

In this example, the activity sensors are designed to send an item of absence of human activity information. It is emphasized here that this item of information may also be deduced implicitly due to the lack of reception of an item of human activity information. This is the case in particular for the activity sensor 56, which is situated in the hallway of the dwelling and has not transmitted any item of information.

In this embodiment, the actimetry server 40 centralizes the items of data representative of human activity in a geographical area for a plurality of dwellings and is connected to the wide area communication network. It is in particular able to be interrogated by the administration server 30.

In another embodiment, the collection device 50 centralizes the items of data representative of human activity in a geographical area for the dwelling corresponding to the local area network 2.

In one particular embodiment, the collection device 50 belongs to the local area network 2. A device of the local area network is thus able to interrogate the collection device in order to obtain an item of actimetry data.

In one particular embodiment, the collection device 50 is also administered remotely by the administration server 30.

A remote administration system comprises in particular:
  the administration server 30 connected to a wide area communication network, designed to remotely administer a device of a local area network;
  at least one device 20, 21 of a local area network 2, which device is to be updated;
  a module for obtaining at least one item of data representative of human activity in a geographical area in which a device to be updated is situated;
  an update command module, designed to defer the update when the item of data obtained indicates human activity in said geographical area and to execute it in the opposite case.

The items of data representative of human activity in a geographical area may be obtained by an obtaining module on interrogation or else on subscription. In one particular embodiment, the obtaining module transmits for example a query to the server 40 or to the device 50 in order to obtain the item of data for a geographical area in which the device to be updated is situated. In another particular embodiment, the obtaining module subscribes to the server 40 or to the device 50 in order to obtain the item of data for a geographical area in which the device to be updated is situated, when said item of data is modified.

In another embodiment, the item of data representative of human activity in a geographical area is obtained directly from an activity sensor installed and located in this geographical area. By way of illustrative example, a motion sensor may thus directly send an item of detection information, thus corresponding to an item of data representative of human activity.

It is also emphasized that the geographical area taken into consideration depends on the device to be updated. By way of illustrative example, when the device to be updated is a gateway for accessing the wide area communication network, enabling access to this network for all of the devices of the local area network 2, the geographical area corresponds to the dwelling in its entirety. When the device to be updated is a TV decoder situated in a room of the dwelling, the geographical area then corresponds to this room. The geographical area to be considered thus depends on the nature of the device to be updated, on the service offered by this device and on the physical location of the device.

Figure 2:
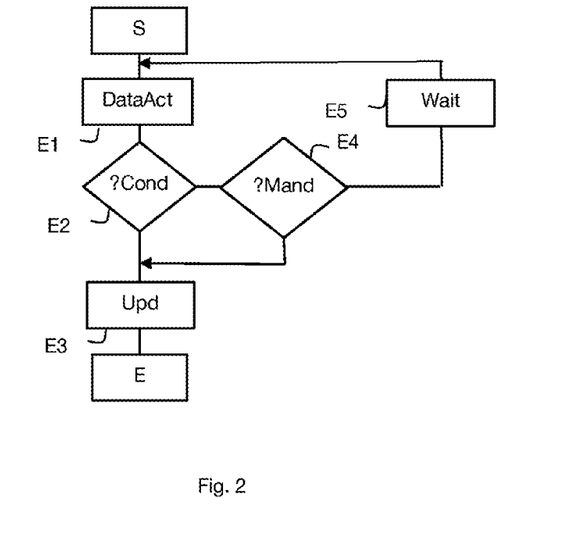
FIG. 2 illustrates steps of a remote administration method that are implemented in an administration system according to one particular embodiment.

We will now describe the remote administration technique in one particular embodiment in relation to FIG. 2.

The execution of the following steps is triggered when an update needs to be installed on a device of the local area network 2 administered by the administration server.

In a step E1, the obtaining module obtains at least one item of data representative of human activity in a geographical area in which the device to be updated is situated. This item of data may be obtained on demand or else on subscription, as described previously.

In a step E2, the update command module checks, on the basis of the item of data obtained, whether the update is able to be performed immediately. More precisely, the command module takes a decision to execute the update or to defer the update on the basis of the item of data obtained. Other conditions may also be taken into account during this step E2, such as for example the fact that a service is being executed in the local area network.

When the item of data does not indicate any human activity in the geographical area in which the device to be updated is located, the update is able to be performed immediately, and an update command is transmitted in a step E3 to the device to be updated. This completes the updating process.

When the item of data indicates human activity in the geographical area in which the device to be updated is located, the command module checks, in a step E4, whether the update is mandatory. This is for example the case when it has been deferred several times or when a deferral period has expired. This is also the case for security updates.

When the update is mandatory, step E3 is implemented, that is to say an update command is transmitted to the device to be updated.

When the update is not mandatory, in a step E5, the command module defers the update. A timeout associated with a deferral period is for example triggered in order to guarantee that the update will indeed be performed within a maximum deadline corresponding to the deferral period. The command module then implements step E1 anew. When a new item of data indicates an absence of human activity in the geographical area or upon expiry of the item of deferral data, the update is then able to be executed in step E3.

In one particular embodiment, the steps of the updating process are implemented directly by the device to be updated. In this particular embodiment, the device to be updated receives, from the administration system, an update command, the execution of this update being conditional upon said item of data obtained. The device to be updated then implements the various steps of the method, step E3 then corresponding to a command to execute the update.

The updating of the device is thus performed when no human activity is detected for a geographical area in which the device is situated. This makes it possible to limit the disruption caused to the potential users of the device. A service interruption associated with the update thus preferably occurs when it is highly unlikely that the device is being used.

Figure 3A:
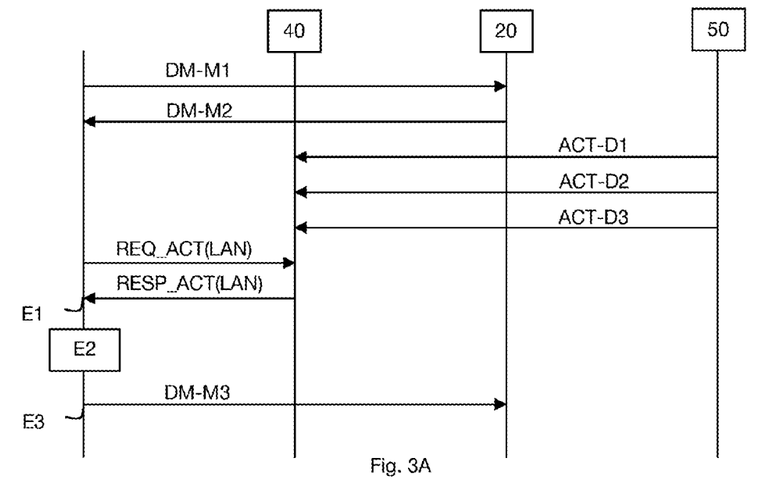
FIGS. 3A-3D illustrate exchanges in an administration system for implementing a remote administration method according to various particular embodiments.

FIG. 3A illustrates an implementation of the administration method, such as described previously, by an administration system in a first embodiment. The administered device corresponds to the access gateway 20 situated in the room P4. In this first embodiment, the administration server 30 interacts with the actimetry server 40 centralizing items of actimetry data in order to obtain an item of data representative of human activity in a geographical area served by the local area network.

The administration server 30 sends a request DM-M1 relating to a state of the device 20. This request M1 is for example in accordance with the CWMP protocol.

The device 20 responds by providing its state in a message DM-M2. This response M2 is for example in accordance with the CWMP protocol.

The collection device 50 independently transmits a plurality of items of data ACT-D1, ACT-D2, ACT-D3 representative of human activity in a geographical area to the actimetry server 40.

On the basis of the obtained state of the device 20, the administration server 30 determines that an update needs to be executed and transmits a request REQ_ACT(LAN) for items of actimetry data to the actimetry server 40 for the local area network 2 to which the device 20 to be updated belongs. The actimetry server transmits the items of actimetry data that are associated with the local area network 2 in a response message RESP_ACT(LAN) (step E1). The items of data are for example provided for all of the rooms.

In step E2, the administration server 30 checks whether the update is able to be performed on the basis of a received item of data for the geographical area in which the device 20 is situated.

The update command may then be sent (step E3) to the device 20 in a message DM-M3, or the update is deferred (step E5). The message M3 is for example in accordance with the CWMP protocol.

In another embodiment, not shown, the administration server 30 subscribes to the actimetry server 40 in order to obtain items of actimetry data when there is a modification to an item of actimetry data associated with the local area network. Upon each reception of an item of actimetry data associated with the local area network, the administration server 30 checks whether the update is able to be performed.

This subscription may be triggered when an update of a device of the local area network 2 needs to be performed. Once the update has been carried out, the administration server 30 unsubscribes.

Figure 3B:
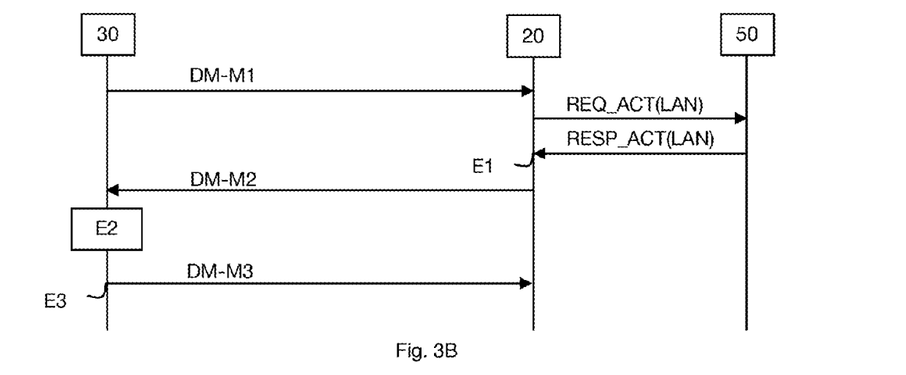

FIG. 3B illustrates an implementation of the administration method, such as described previously, by an administration system in a second embodiment. The administered device corresponds to the access gateway 20 situated in the room P4. In this second embodiment, the device 20 to be updated interacts with the collection device 50 in order to obtain an item of data representative of human activity in a geographical area. This interaction is thus performed within the local area network.

The administration server 30 sends a request DM-M1 relating to a state of the device 20. This request M1 is for example in accordance with the CWMP protocol.

The device 20 to be updated transmits a request REQ_ACT(LAN) for items of actimetry data to the collection device 50. The device 50 transmits the items of actimetry data in a response message RESP_ACT(LAN) (step E1).

The device 20 responds to the administration server 30 by providing its state in a message DM-M2 and the item(s) of actimetry data obtained. This response M2 is for example constructed so as to be in accordance with the CWMP protocol and designed to comprise items of actimetry data through a data model describing the items of information and their type.

On the basis of the state of the device 20, the administration server 30 determines that an update needs to be executed and the administration server 30 checks (step E2) whether the update is able to be performed on the basis of a received item of data representative of human activity for the geographical area in which the device 20 is situated.

The update command may then be sent (step E3) to the device 20 in a message DM-M3, or the update is deferred (step E5). The message M3 is for example in accordance with the CWMP protocol.

In this second embodiment, the items of actimetry data are centralized in a device of the local area network, and the interchanges of items of actimetry data are performed between devices of the local area network.

Figure 3C:
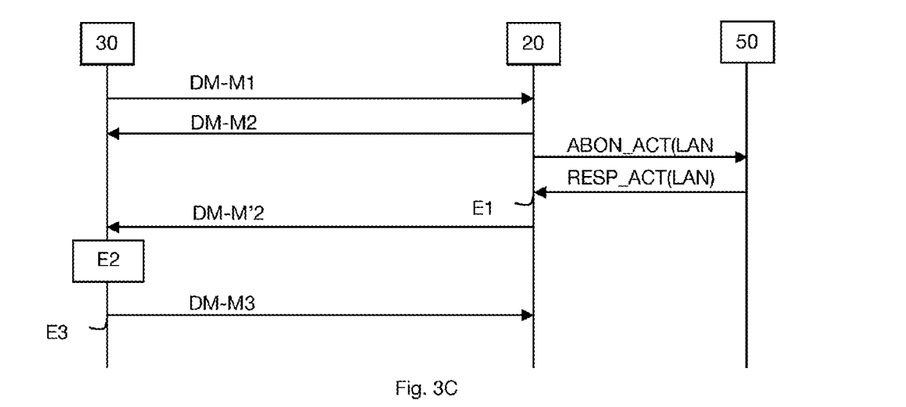

FIG. 3C illustrates an implementation of the administration method, such as described previously, by an administration system in a third embodiment. The administered device corresponds to the access gateway 20 situated in the room P4. In this third embodiment, the device 20 to be updated subscribes to the collection device 50 in order to obtain an item of data representative of human activity in a geographical area.

The administration server 30 sends a request DM-M1 relating to a state of the device 20. This request M1 is for example in accordance with the CWMP protocol.

The device 20 responds by providing its state in a message DM-M2. This response M2 is for example in accordance with the CWMP protocol.

The device 20 to be updated transmits a request ABON_ACT(LAN) to subscribe to items of actimetry data to the collection device 50. The device 50 transmits the items of actimetry data in a response message RESP_ACT(LAN) (step E1).

The device 20 responds to the administration server 30 by providing its state in a message DM-M'2 and the item(s) of actimetry data obtained. This response M'2 is for example constructed so as to be in accordance with the CWMP protocol and designed to comprise items of actimetry data through the data model describing the items of information and their type.

On the basis of the state of the device 20, the administration server 30 determines that an update needs to be executed and the administration server 30 checks (step E2) whether the update is able to be performed on the basis of a received item of actimetry data for the geographical area in which the device 20 is situated.

The update command may then be sent (step E3) to the device 20 in a message DM-M3, or the update is deferred (step E5). The message M3 is for example in accordance with the CWMP protocol.

Figure 3D:
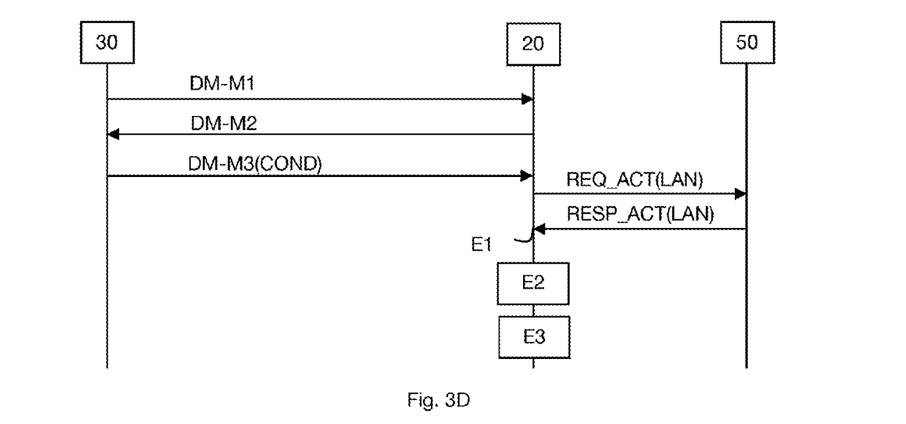

FIG. 3D illustrates an implementation of the administration method, such as described previously, by an administration system in a fourth embodiment. The administered device corresponds to the access gateway 20 situated in the room P4. In this fourth embodiment, the device 20 to be updated decides to execute or to defer the update on the basis of an item of data representative of human activity in a geographical area, obtained from the collection device 50.

The administration server 30 sends a request DM-M1 relating to a state of the device 20. This request M1 is for example in accordance with the CWMP protocol.

The device 20 responds by providing its state in a message DM-M2. This response M2 is for example in accordance with the CWMP protocol.

On the basis of the state of the device 20, the administration server 30 determines that an update needs to be executed. The administration server 30 then sends a conditional update command to the device 20 in a message DM-M3(COND). This command M3 is for example constructed so as to be in accordance with the CWMP protocol and designed to comprise in particular a condition relating to human activity in the geographical area in which the device to be updated is situated through the data model describing the items of information and their type.

The device 20 to be updated transmits a request REQ_ACT(LAN) for items of actimetry data to the collection device 50. The device 50 transmits the items of actimetry data in a message RESP_ACT(LAN)(step E1).

The device 20 checks (step E2) whether the update is able to be performed on the basis of at least one received item of actimetry data. The update is commanded and executed (step E3) or else deferred (step E5) on the basis of the item of data.

In this embodiment, the items of actimetry data are collected and centralized in the local area network. The administration system systematically sends an update command, the execution of which is conditional at least upon an absence of human activity. The device executes the update on the basis of at least one item of data representative of human activity in the geographical area in which it is situated.

In another embodiment, the device 20 to be updated transmits, to the collection device 50, a request REQ_ACT (LAN) to subscribe to items of actimetry data. The device 50 transmits the items of actimetry data in a response message RESP_ACT(LAN) (step E1). Thus, once the device to be updated has received an update command, it subscribes to the items of actimetry data, and when human activity allows an update without service interruption, it performs the update.

The updating of a device is thus conditional upon an item of data representative of human activity in a geographical area in which the device is situated.

In one particular embodiment, the administration method also takes into consideration, in step E2, one or more active services in the local area network. These may be for example an alarm service, a home care service, etc. Specifically, for such services, it is necessary to control service interruptions resulting from an update to a device.

In a first illustrative example of the implementation of this administration technique, a TV decoder situated in the lounge P4 needs to be updated. However, human activity is detected in this room. The update is deferred so as not to disturb the user of this device and avoid interactions between the user and the device, which interactions could potentially lead to damage to the hardware.

In a second illustrative example of the implementation of this administration technique, a gateway for accessing the wide area communication network needs to be updated. As human activity of a person is detected for the dwelling, the update is deferred. As soon as this is no longer the case, the update is executed.

As described previously, the administration system comprises a module for obtaining at least one item of data representative of human activity in a geographical area in which a device to be updated is situated, and a module for commanding the update, designed to defer the update when the item of data obtained indicates human activity in said geographical area and to execute it in the opposite case.

Figure 4:
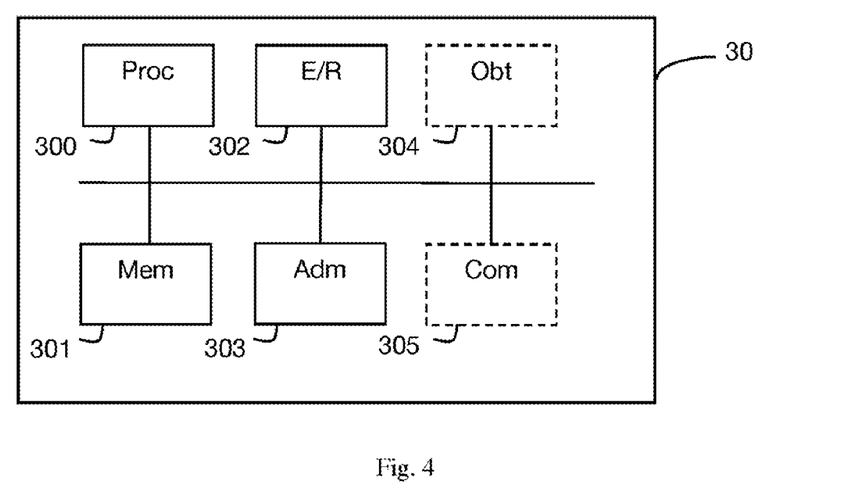
FIG. 4 shows an administration server according to one particular embodiment.

In one particular embodiment, the administration server 30 comprises these two modules. We will now describe such a server 30 in one particular embodiment with reference to FIG. 4. The administration server 30 is designed to remotely administer devices situated in a local area network and comprises in particular:

- a memory area 301, designed to store in memory an application that comprises code instructions for implementing the steps of the administration method, such as is described previously;
- a storage memory, not shown, designed to store items of data that are used during the implementation of the administration method, such as is described previously;
- a processor 300 for executing software module code instructions;

a module 302 for interfacing with the wide area communication network, designed to send and receive items of data;

an administration module 303, designed to implement the administration functions defined in the technical report TR-069;

a module 304 for obtaining at least one item of data representative of human activity in a geographical area in which a device to be updated is situated;

a command module 305, designed to defer the update when the item of data obtained indicates human activity in said geographical area and to execute it in the opposite case.

It is emphasized here that the administration server 30 also comprises other processing modules, not shown in FIG. 4, that are designed to implement the various administration server functions.

In this first embodiment, the administration server 30 interacts with:

the actimetry server 40 (FIG. 3A) or with the device to be updated (FIGS. 3B and 3C) in order to obtain an item of actimetry data;

the device to be updated in order to obtain an item of state information and in order to command an update.

Figure 5:
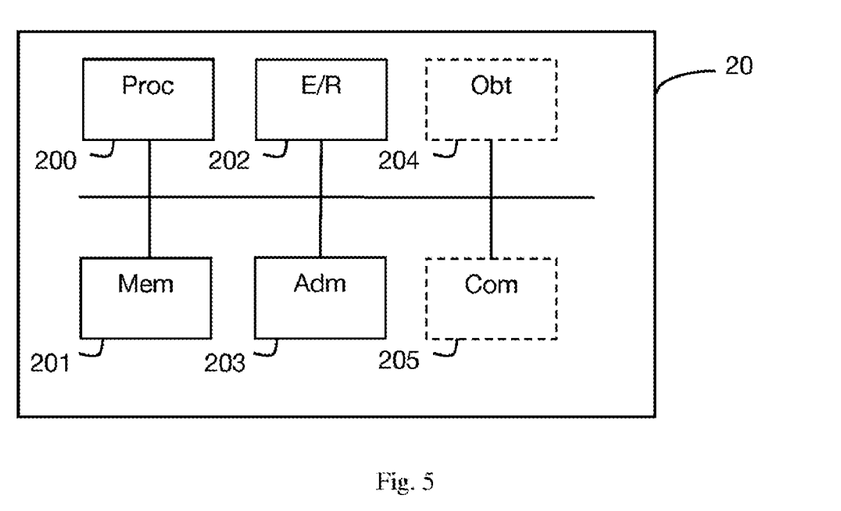
FIG. 5 shows a device according to one particular embodiment.

The device 20 administered by the administration server in this first embodiment, as shown in FIG. 5, comprises in particular:

a memory area 201, designed to store in memory an application that comprises code instructions for implementing the steps of the administration method, such as is described previously;

a storage memory, not shown, designed to store items of data that are used during the implementation of the administration method, such as is described previously;

a processor 200 for executing software module code instructions;

an interface module 202, designed to send and receive items of data;

an administration module 203, designed to be administered remotely by an administration server, in particular to interchange items of administration data with this server.

It is emphasized here that the device 20 also comprises other processing modules, not shown in FIG. 5, that are designed to implement the various functions of this device.

The administration module 203 implements for example the administration functions defined in the technical report TR-069.

In one particular embodiment (FIGS. 3B, 3C), the device 20 also comprises a module 204 for obtaining at least one item of data representative of human activity in a geographical area in which it is situated. This item of data may be obtained on request or on subscription to a collection device 50. This item of data is then sent to the administration server by the administration module 203.

In a second embodiment, the device to be updated comprises:

a module 204 for obtaining at least one item of data representative of human activity in a geographical area in which it is situated;

a command module 205, designed to defer an update when the item of data obtained indicates human activity in said geographical area and to execute it in the opposite case.

In this second embodiment, the administration server 30 comprises the memory area 301, a storage memory, the processor 300, the module 302 for interfacing with the wide area communication network and the administration module 303, such as are described previously.

The command module 205 is in particular designed to receive, from the administration server 30, a conditional update command, such as is described previously in relation to FIG. 3D.

The administration technique is implemented by way of software and/or hardware components. With this in mind, the term 'module' may correspond in this document equally to a software component or to a hardware component or to a set of software and/or hardware components that is able to implement a function or a set of functions, in accordance with what is described previously for the module in question.

A software component corresponds to one or more computer programs, one or more subroutines of a program, or more generally to any element of a program or of an item of software. Such a software component is stored in memory and then loaded and executed by a data processor of a physical entity, and is able to access the hardware resources of this physical entity (memories, recording media, communication buses, input/output electronic cards, user interfaces, etc.).

In the same manner, a hardware component corresponds to any element of a hardware assembly. It may be a programmable or non-programmable hardware component, with or without an integrated processor for executing software. It may be for example an integrated circuit, a chip card, an electronic card for executing an item of firmware, etc.

In one particular embodiment, the modules 304, 305 are designed to implement the administration method described previously. They are preferably software modules comprising software instructions for executing those steps of the administration method described previously that are implemented by an administration server. The invention therefore also relates to:

a program for a server, comprising program code instructions that are intended to command the execution of the steps of the administration method described previously when said program is executed by this server;

a recording medium able to be read by a server and on which the program for a server is recorded.

In one particular embodiment, the modules 204, 205 are designed to implement the administration method described previously. They are preferably software modules comprising software instructions for executing those steps of the administration method described previously that are implemented by a device. The invention therefore also relates to:

a program for a device, comprising program code instructions that are intended to command the execution of the steps of the administration method described previously when said program is executed by said device;

a recording medium able to be read by a device and on which the program for a device is recorded.

The software modules may be stored on or transmitted by a data medium. The latter may be a hardware storage medium, for example a CD-ROM, a magnetic floppy disk or a hard disk, or else a transmission medium such as an electrical, optical or radio signal, or a telecommunication network.

An exemplary embodiment of the invention mitigates inadequacies/drawbacks of the prior art and/or to provide improvements thereto.

It goes without saying that the embodiments that have been described previously have been given purely by way of entirely non-limiting indication, and that numerous modifications may easily be made by those skilled in the art without departing from the scope of the invention.

The invention claimed is:

1. A method comprising:
remotely administering a device, which is not a medical device, of a local area network by an administration server connected to a wide area communication network, wherein remotely administering comprises:
using CPE WAN Management Protocol (CWMP) for communicating between the device and the administration server;
obtaining at least one item of data representative of human activity in a geographical area in which the device to be updated is situated, wherein the item of data is determined from a plurality of items of information that are collected from activity sensors that are distinct from the device being administered and are distributed in a service area of the local area network, the activity sensors sensing activity of at least one human in the service area whether the at least one human is a user of the device or not;
deferring the update when the item of data obtained indicates human activity in said geographical area; and
forcing, by the administration server, performing the update when a number of deferring the update at the device reaches a predetermined threshold.

2. The method as claimed in claim 1, comprising sending an update command by the administration system to the device, wherein execution of said update is conditional upon said obtained item of data.

3. The method as claimed in claim 1, wherein at least one of the activity sensors is located in the geographical area.

4. The method as claimed in claim 1, wherein the update is executed following the obtaining of a new item of data representative of human activity in the geographical area indicating human inactivity in said geographical area.

5. The method as claimed in claim 1, wherein the update is executed upon expiry of a deferral period, indicating the update is mandatory.

6. The method of claim 1, wherein the activity sensors are selected from the group consisting of a motion sensor, a presence sensor, an event detector, a camera, an electrical socket analyzing consumption, or a heat, water or electricity probe.

7. A system for remote administration of devices, said system comprising:
an administration server having a hardware processor connected to a wide area communication network, which is configured to remotely administer at least one device of a local area network, which is not a medical device, using CPE WAN Management Protocol (CWMP) for communicating between the device and the administration server;
the at least one device of the local area network, which is to be updated;
a plurality of activity sensors distributed in a service area of the local area network, which are distinct from the at least one device to be updated and sense activity of at least one human in the service area whether the at least one human is a user of the device or not;
a module that is configured to collect a plurality of items of information from the plurality of activity sensors to obtain at least one item of data representative of human activity in a geographical area in which the at least one device to be updated is situated; and
an update command module, of the administration server or of the device to be updated, configured to:
defer the update when the at least one item of data obtained indicates human activity in said geographical area; and
forcing, by the administration server, performing the update when a number of deferring the update at the device reaches a predetermined threshold.

8. A server for remote administration of devices, said server comprising:
a processor; and
a non-transitory computer-readable medium comprising instructions stored thereon, which when executed by the processor configure the server to perform acts comprising:
remotely administering at least one device of a local area network that is to be updated;
using CPE WAN Management Protocol (CWMP) for communicating between the at least one device and the administration server;
obtaining at least one item of data representative of human activity in a geographical area in which the at least one device, which is not a medical device, to be updated is situated, the administration server determining the item of data from a plurality of items of information that are collected from activity sensors that are distinct from the at least one device being administered and are distributed in a service area of the local area network, the activity sensors sensing activity of at least one human in the service area whether the at least one human is a user of the at least one device or not;
deferring the update when the at least one item of data obtained indicates human activity in said geographical area; and
forcing, by the administration server, performing the update when a number of deferring the update at the device reaches a predetermined threshold.

9. A device of a local area network, which is not a medical device, said device comprising:
a processor; and
a non-transitory computer-readable medium comprising instructions stored thereon, which when executed by the processor configure the device to perform acts comprising:
operating an administration module, configured to be administered remotely by an administration server, connected to a wide area communication network, using CPE WAN Management Protocol (CWMP) for communicating between the device and the administration server;
obtaining at least one item of data representative of human activity in a geographical area in which the device to be updated is situated, the item of data being determined from a plurality of items of information that are collected from activity sensors that are distinct from the device being administered and are distributed in a service area of the local area network, the activity sensors sensing activity of at least one human in the service area whether the at least one human is a user of the device or not;
deferring the update when the item of data obtained indicates human activity in said geographical area; and
performing the update, said update being forced by the administration server when a number of deferring the update at the device reaches a predetermined threshold.

10. A non-transitory computer-readable recording medium comprising instructions stored thereon, which when executed by a processor configure the processor to implement a method of remotely administering a device of a local area network to be updated by an administration server connected to a wide area communication network, the processor being an element of the device to be updated or the administration server, the device to be updated being not a medical device, said method comprising the following acts performed by the processor:

- using CPE WAN Management Protocol (CWMP) for communicating between the device to be updated and the administration server;
- obtaining at least one item of data representative of human activity in a geographical area in which the device to be updated is situated, the item of data being determined from a plurality of items of information that are collected from activity sensors that are distinct from the device being administered and are distributed in a service area of the local area network, the activity sensors sensing activity of at least one human in the service area whether the at least one human is a user of the device or not;
- deferring the update when the item of data obtained indicates human activity in said geographical area; and
- performing the update, said update being forced by the administration server when a number of deferring the update at the device reaches a predetermined threshold.

* * * * *